Patented Feb. 25, 1936

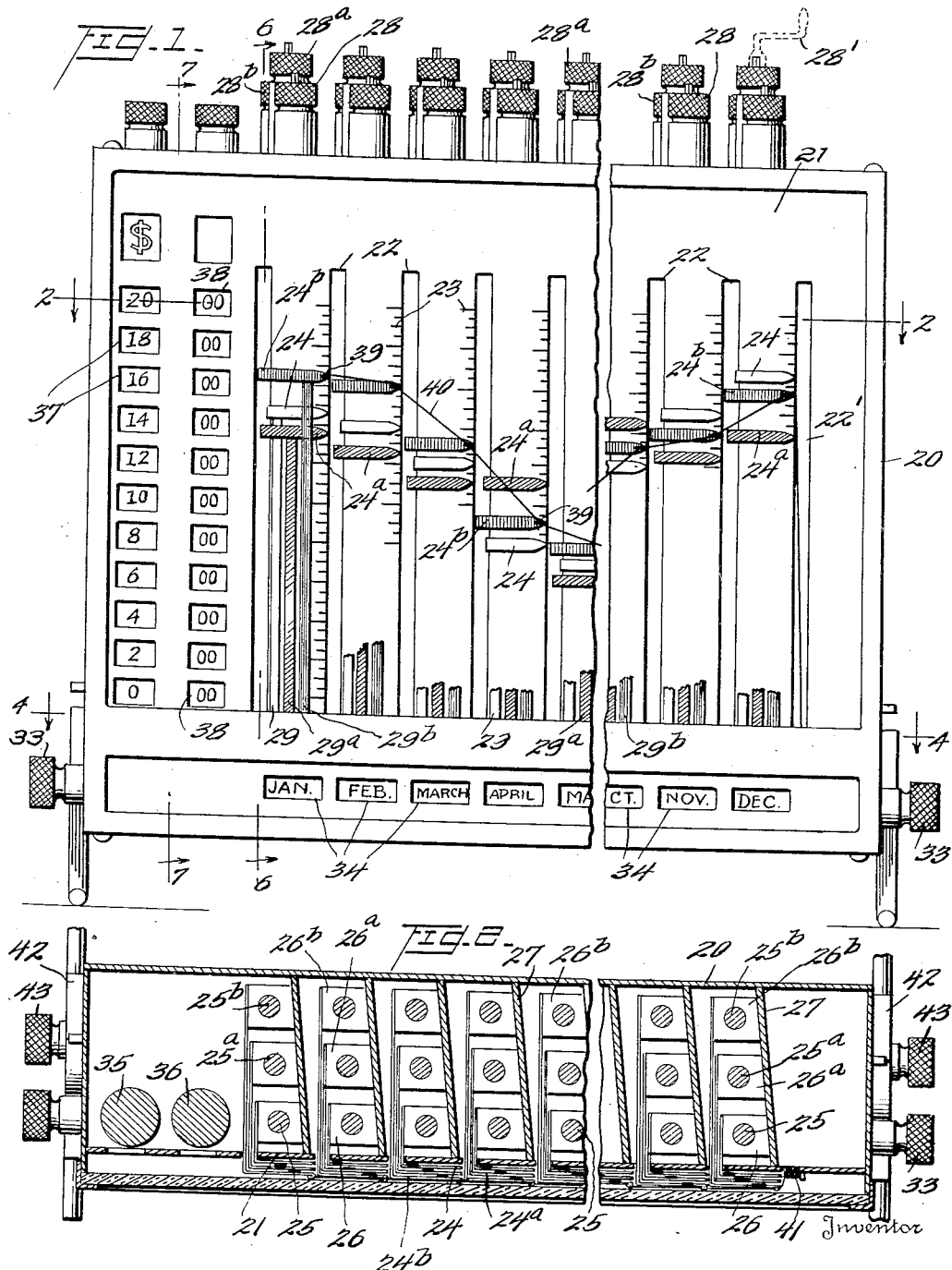

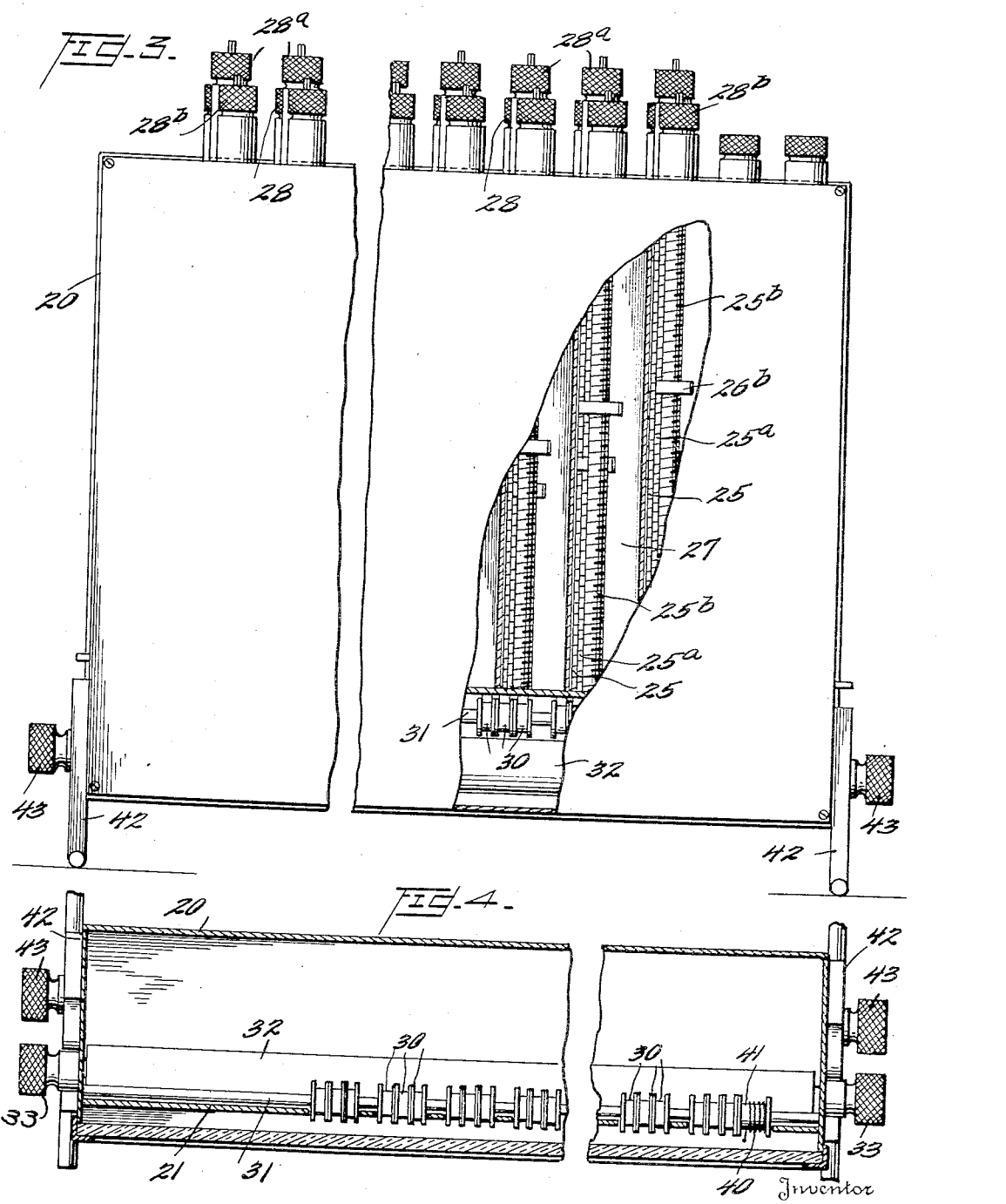

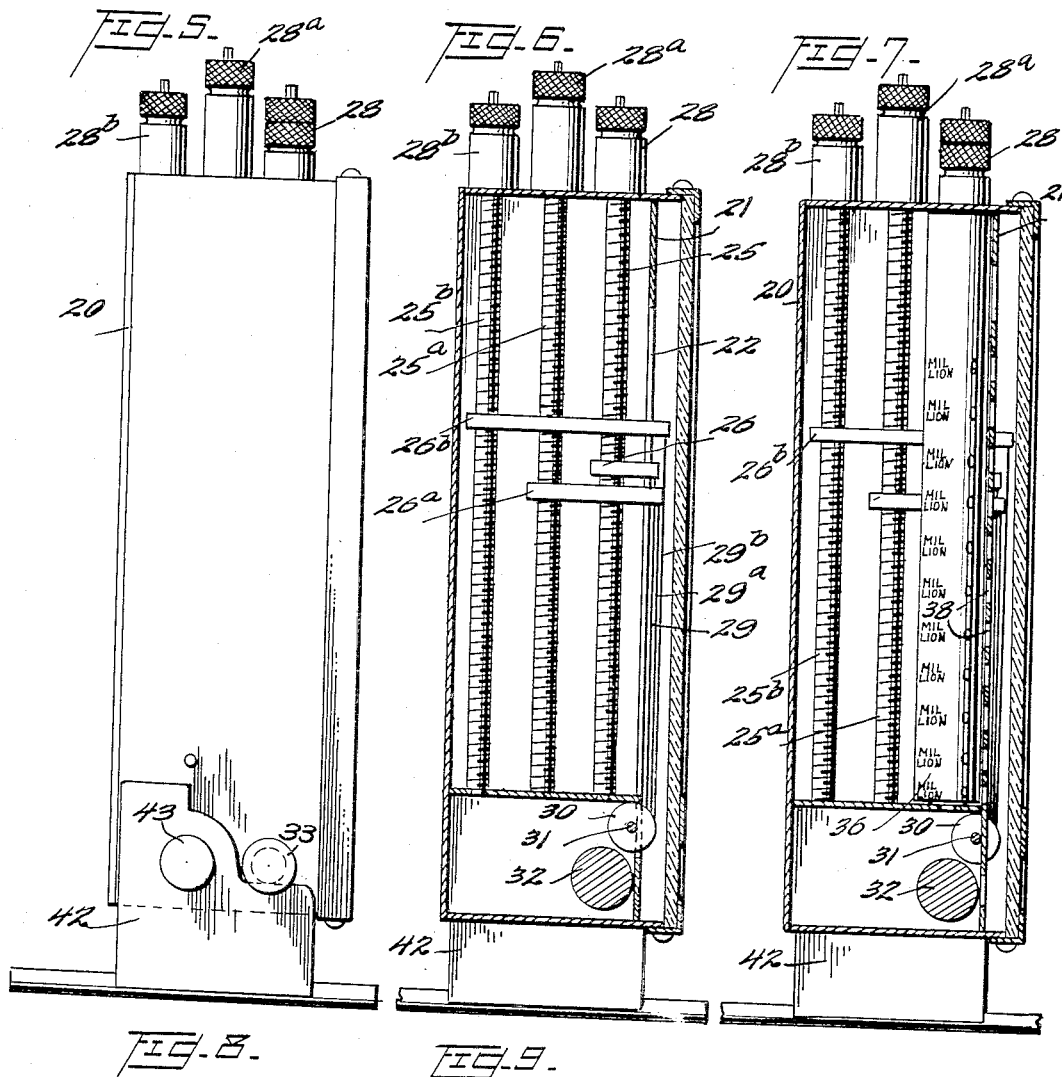

2,032,304

UNITED STATES PATENT OFFICE 2,032,304

DATA INDICATOR

Benjamin Lewis Padgett, Brooklyn, N. Y.

Application January 30, 1933, Serial No. 654,299

14 Claims. (Cl. 116—135)

This invention relates to indicating devices and particularly to a data indicator which can be readily adjustable to indicate varying relative values.

In business and industry at the present time, there is a desire on the part of executives to have before them graphic visual indicating means showing the present or past conditions of certain phases of the business or industry.

To fill this need it is common to draw curves on cross section paper, these curves showing values in dollars or output and covering any desired period of time.

The primary object of this invention is the provision of an all-mechanical graphic data indicator whereby one may with perfect ease and great precision portray statistical and other data instantaneously and effectively, thereby eliminating all of the usual labor necessary in constructing the usual drawn graphic charts.

Another object of the invention is the provision of an improved data indicator which is readily set to show varying data conditions on a two co-ordinate chart.

Still another object of the invention is the provision for readily setting and resetting a plurality of sets of indicia involving two coordinates for each set of indicia.

A further object of the invention is the provision of an improved data indicator whereon a plurality of sets of indicia involving two coordinates may be set to show the relative values of the indicia within the set and the relative values of the indicia of one set to that of another set.

A still further object of the invention is the provision of a data indicator whereon a set of data may be placed and whereon will then automatically be indicated the continuity or curve between the points which indicate the several data.

A still further object of the invention is the provision of means in such an indicator for changing the value of the indicated coordinates.

A still further object of the invention is the provision of means in such an indicator for changing the unit of the coordinates and for changing the value of the unit.

A still further object of the invention is the provision in a data indicator, of means for positively moving the data point-indicating means and to hold them at desired places on the indicating device.

A still further object of the invention is the provision in such a data indicator of a plurality of linearly moving point-indicating means for indicating a plurality of points along a straight line and means for moving one of the point-indicating means independently of another.

A still further object of the invention is the provision in such a data indicator, of point-indicating devices with means moving with the point-indicating devices and giving different appearance characteristics on opposite sides of the point-indicating devices and regardless of the place of adjustment of the latter.

Other and further objects of the invention will be apparent to those skilled in the art, from a reading of the complete specification and claims.

The invention permits of the mechanical representation of curves or bar-charts of the kind most commonly used or it may be made with varicolored indicating arrows which are, at will, moved up and down along a finely graduated scale by turning knobs to operate a rod having an ordinary thread throughout its length, or if desired, a removable crank or key may be used to operate on a square or irregular shaped end. The point-indicating devices move along slots to indicate the desired values of the coordinates. In the case of the curved type of chart, nuts engaging the threaded rod, carry the point-indicating devices which in turn carry eyelets to hold in place the flexible or resilient curve member. In the case of the bar type, a member is moved with or by the point-indicating device to give opposite sides of the point-indicating devices, different appearance characteristics. This is illustrated as by a band which is attached to the point-indicating device and is drawn up from the bottom and taken up when the point-indicating device is lowered.

The device may be made small enough to conveniently set upon the desk of a business man or executive. He or a clerk may, at will, change the indications to show movements or trends of his business activities by simply turning the knobs forward or backward which action will cause the point-indicating devices to move upwardly or downwardly as the case may be.

The construction is such that will permit the representation of a plurality of comparable points along the same line so that for example, conditions a year ago and two years ago may be visually compared with the present year and for the same month or week, etc. The carrying and operating means for the point-indicating device are so made as to permit the passage of any one by the other. By coloring distinctively the different point-indicating means of one vertical group, as illustrated, the comparison of the values of similar conditions at different times, is made easier.

This invention may be used by any type of business or profession, schools, broker's offices, stock exchanges or wherever variations in conditions are required to be represented visually with two coordinates. A stock exchange or broker's office, for example, may with my invention, post both graphically and in figures the movements, in prices, of stocks or bonds, the instant they occur, thereby eliminating the laborious methods of continually erasing and writing in the new figures. The previous high and low prices would be indicated by point-indicating devices of other colors.

The device for the business man's desk can be as small as desired, when he is handed a report or set of figures, he can immediately visualize them graphically by setting the point-indicating devices to the proper places, turning the coordinate-indicating means so that they too will apply to the set of figures being represented. This latter may be in the form of different sets of indicia in longitudinal lines around the periphery of a cylinder so that the turning of a knob will bring the required indicia—such as days of the week, months, years, etc. or numbers or percentages etc.—into view to apply to the lines on the face of the chart and to the points indicated by the point-indicating devices. By adjusting the coordinate-indicating cylinder, the scale can be increased or decreased at will.

This invention may be exemplified by a precision machine since a reading can be taken to the finest possible degree—to the thousandth of an inch or less, if desired.

Photostatic copies of the face of the chart may be taken at any time.

In this way a permanent record can be made immediately after the data is received—without the necessity of sacrificing much time and labor in making the usual graphic charts.

Referring to the drawings wherein I have illustrated my invention,

Figure 1 is a front elevation of the embodiment of my invention.

Figure 2 is a cross section on the line 2—2 of Figure 1.

Figure 3 is a rear view with the back cover plate removed.

Figure 4 is a cross section on the line 4—4 of Figure 1.

Figure 5 is an end view.

Figure 6 is a cross section on the line 6—6 of Figure 1.

Figure 7 is a cross section on the line 7—7 of Figure 1.

Figures 8, 9, and 10 are fragmental sections of the development of the rolls for designating the coordinates.

The same reference characters refer to the same or similar parts throughout the specification and drawings.

In the drawings, 20 designates the main frame member of an embodiment of my invention which is adapted to be used on the desk of an executive.

On the front of the frame 20 is located a chart face 21 which is preferably made up of strips with spaces or slots 22 therebetween. Adjacent one edge of each slot and on the chart face is a graduated scale 23.

In this type of device, the $x$-coordinate is a time factor as will be set forth. The $y$-coordinate is set by moving the pointers 24, 24$^a$, and 24$^b$ upwardly or downwardly adjacent the slot 22.

These pointers 24, 24$^a$, 24$^b$, serve as the point-indicating devices.

At the rear of the chart face 21 and journaled at their ends in the frame 20 are threaded shafts which are turned by means spaced from the point-indicating means. These shafts which I have designated 25, 25$^a$ and 25$^b$, have nuts 26, 26$^a$, 26$^b$ mounted thereon and are provided with carrier arms which connect to the respective point-indicating devices 24, 24$^a$, 24$^b$. These shafts are preferably slightly offset from rear to front to provide for clearance for the carrier-arms which connect the nuts 26, 26$^a$, 26$^b$ with the point-indicating devices 24, 24$^a$, 24$^b$.

The carrier arms are of such a length that the point-indicating devices 24, 24$^a$, 24$^b$, will be in one position superimposed relative to each other.

In order to keep the nuts 26, 26$^a$, 26$^b$, in proper relation to each other as they travel along the respective shafts 25, 25$^a$, 25$^b$, I provide guide plates 27 which are held in parallel relation to the shafts 25, 25$^a$, 25$^b$, and have their ends secured at their ends to the frame 20. Knobs 28, 28$^a$, 28$^b$ are provided on the upper ends of the respective shafts 25, 25$^a$, 25$^b$, to turn the shafts and effect the raising and lowering of the point-indicating devices 24, 24$^a$, 24$^b$. It will be observed that the arrangement shown permits each knob of a set 28, 28$^a$, 28$^b$ to be operated independently so that each nut 26, 26$^a$, 26$^b$ may raise or lower and each point-indicating device 24, 24$^a$, 24$^b$ is independent of every other of its set. When the nuts 26, 26$^a$, 26$^b$ are at the same height there will be only one point-indicating device 24$^b$ in sight, the others being behind 24$^b$. If desired, a crank 28' may be used to turn the knobs 28, 28$^a$, 28$^b$, each one of which is supplied with a square end.

When using the modification as a bar chart or at any other time when desired, I may attach a means to move with the point-indicating device to give a different appearance characteristic on one side of the point-indicating device. In the modification illustrated, I have provided flexible bands 29, 29$^a$, 29$^b$, each attached at one end to the respective point-indicating devices 24, 24$^a$, 24$^b$.

Their lower ends are wound on separate spring-actuated spools or drums 30 which normally tend to wind up the bands. As the point-indicating devices move, the spools 30, take up or pay out the bands 29, 29$^a$, 29$^b$ as needed. The spools 30 are mounted on the axle-shaft 31 and have their springs secured to the axle shaft to give them a normal tendency to take up on the respective bands.

For the sake of clearness, the bands 29, 29$^a$, 29$^b$ are broken away in many instances.

These bands 29, 29$^a$, 29$^b$ and the corresponding point-indicating devices are preferably made in colors so that the point-indicating device and its band of one color will be easily distinguishable from other bands and point-indicating means.

In order to show the values of the points designated by the point-indicating devices, there are provided coordinate-indicating means, here illustrated as being placed at the left side for the $y$ or ordinate factor and at the bottom for the $x$ or abscissa factor $o$.

The $x$-factor is, in the instant embodiment, the time factor. As shown, I have provided a roll or drum upon which I have illustrated the months of the fiscal year for one setting the months of the calendar year for a second setting, the days of the week for a third setting and consecutive years for a fourth setting. This roll or drum I have designated 32.

The shaft of the drum 32 extends through the main frame 20 at the right side thereof and has mounted thereon, a thumb knob 33 which may be utilized to turn the drum to bring the desired indicia in position to be seen through the small windows 34.

The y-factor is in the illustrated structure, the variable, and is shown by two drums mounted on vertical axes. On these drums which I have designated 35 and 36 are indicia indicating units, tens, hundreds, thousands and millions. The indicia of the two drums are read together through the windows 37 and 38, one window of each drum being on the level with each of the main subdivisions on the chart face scales 23.

In order to use my invention as a curve chart, I have provided eyelets 39 on each point indicating device 24[b]. A flexible or resilient member 40, which may be of thread, wire, elastic band or other suitable material, is secured at the left hand eyelet 39 and passes through all of the others and then through the end slot 22' which has no carrier arm or point-indicating device. This curve indicating member 40 extends through the slot 22' to the rear of the chart face 21 and to a take-up drum or spool 41 mounted on the shaft 31 and constructed in a manner somewhat similar to the drums 30.

In order to support my main frame 20, I mount, at each end, an adjustable leg 42 which is held in place in adjusted position by the thumb screw 43. By loosening the thumb screws 43, the whole frame may be adjusted at an angle to bring the chart face 21, perpendicular to the line of sight of the eye of the user.

While I have illustrated and described in detail an embodiment of my invention, I desire to have it understood that the illustration and description are merely illustrative and that modifications and changes may be made without departing from the spirit of the invention and within the scope of the appended claims.

Having described my invention what I claim and desire to secure by Letters Patent is:—

1. A data indicator comprising a chart face having slots, coordinate-indicating means, a series of movable point-indicating devices, screw means arranged at the rear of the respective slots, nuts on the screw means and a carrier arm extending through a slot and connecting each nut with its point-indicating device.

2. A data indicator comprising a chart face, a series of movable point-indicating devices, means extending along the face in one direction for carrying the indicia indicating one set of chart coordinates and means extending along the face in a direction substantially at right angles to the first means and for carrying a second set of indicia for indicating the other coordinates, one of the said means having a plurality of alternate sets of indicia and a hand controlled device for moving the second-named means to, at will, selectively display any one of the alternate sets.

3. A data indicator comprising coordinate-indicating means, a plurality of sets of movable point-indicating devices, means spaced from the point-indicating means to move the corresponding point-indicating means of the different sets at will and independently of each other, the corresponding point-indicating devices being movable along substantially the same line.

4. A data indicator comprising coordinate-indicating means, a plurality of sets of movable point-indicating devices, means spaced from the point-indicating means and operatively connected to the point-indicating means of the different sets for moving the point-indicating means of the different sets and of the same set independently of every other point indicating means and including a handle means for each means for moving the point-indicating means.

5. A data indicator comprising coordinate-indicating means, a plurality of sets of movable point-indicating devices, each set of point indicating means having distinguishable appearance characteristics to distinguish the point-indicating devices of the different sets, and means for moving any point indicating means of one set independently of any point-indicating means of another set, the corresponding point-indicating devices being movable along substantially the same line.

6. A data indicator comprising a chart face having slots, coordinate-indicating means, a plurality of series of movable point-indicating devices, screw devices at the rear of the respective slots, nuts on the screw devices and a carrier arm extending from a nut to each of the respective point-indicating means to support the latter adjacent one of the respective slots and a hand device for moving each screw device.

7. A data indicator comprising coordinate-indicating means and a plurality of sets of movable point-indicating devices, the point-indicating devices of one set having corresponding point-indicating devices of another set, the corresponding point-indicating devices being movable along substantially the same line.

8. A data indicator comprising coordinate-indicating means and a plurality of sets of movable point-indicating devices, the point indicating devices of one set having corresponding point-indicating devices of another set, one set of point-indicating devices having an appearance characteristic to distinguish its points from the points indicated by the point-indicating devices of another set, the corresponding point-indicating devices being movable along substantially the same line.

9. A data indicator comprising coordinate-indicating means, a plurality of sets of movable point-indicating devices, the respective point-indicating devices of one set being superimposed with relation to those of another set when the sets of point-indicating devices are adjusted to indicate the same set of points on the indicator.

10. A data indicator comprising a chart face, a series of movable point-indicating devices, means extending along the face in one direction for carrying a plurality of alternate sets of indicia for indicating one set of chart coordinates and means extending along the face in a direction substantially at right angles to the first means and for carrying a plurality of alternate sets of indicia for indicating the other set of chart coordinates and hand controlled devices for moving the means to, at will, selectively display the desired sets of indicia.

11. A data indicator comprising a chart face having sets of vertical and horizontal lines, point-indicating devices movable along one set of the lines and coordinate-indicating means adjacent one side of the chart face, one of the coordinate-indicating means including a revoluble member having a plurality of sets of indicia opposite to and for indicating at will different meanings of the coordinate-indicating means for any given corresponding lines.

12. A data indicator comprising coordinate-indicating means, a series of movable point-indicating devices and flexible means continuously connecting the several point-indicating devices together to give a curve of the points set on the point-indicating devices and a spring-operated take-up device to hold the flexible means taut as the point-indicating devices are adjusted.

13. A data indicator comprising coordinate-indicating means, a series of movable point-indicating devices and a flexible resilient means continuously connecting the several point indicating devices together to give a curve of the points set on the point-indicating devices.

14. A data indicator comprising a chart face having sets of vertical and horizontal lines, point-indicating devices, parallel slots in the chart face for guiding the respective point-indicating devices, screw devices at the rear of the respective slots, nuts on the screw devices and a carrier arm extending from each nut to a corresponding point-indicating device, to move and support the latter adjacent the respective slots, a hand device for moving each screw device, coordinate-indicating means adjacent one side of the chart face, one of the coordinate-indicating means including a revoluble member having a plurality of sets of indicia opposite to and for indicating, at will, different meanings of the coordinate-indicating means for any given corresponding lines.

BENJAMIN LEWIS PADGETT.